United States Patent
Shao et al.

(10) Patent No.: US 11,636,712 B2
(45) Date of Patent: Apr. 25, 2023

(54) DYNAMIC GESTURE RECOGNITION METHOD, DEVICE AND COMPUTER-READABLE STORAGE MEDIUM

(71) Applicant: UBTECH ROBOTICS CORP LTD, Shenzhen (CN)

(72) Inventors: Chi Shao, Shenzhen (CN); Miaochen Guo, Shenzhen (CN); Jun Cheng, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 36 days.

(21) Appl. No.: 17/463,500

(22) Filed: Aug. 31, 2021

(65) Prior Publication Data

US 2022/0067354 A1 Mar. 3, 2022

Related U.S. Application Data

(63) Continuation of application No. PCT/CN2020/140425, filed on Dec. 28, 2020.

(30) Foreign Application Priority Data

Aug. 25, 2020 (CN) .......................... 202010864060.3

(51) Int. Cl.
*G06V 40/20* (2022.01)
*G06V 10/94* (2022.01)
(Continued)

(52) U.S. Cl.
CPC ............ *G06V 40/20* (2022.01); *G06F 18/217* (2023.01); *G06F 18/2148* (2023.01);
(Continued)

(58) Field of Classification Search
None
See application file for complete search history.

(56) References Cited

U.S. PATENT DOCUMENTS 9,400,548 B2 * 7/2016 Zhang .................. A63F 13/213
9,575,566 B2 * 2/2017 DeBattista ........... G06V 40/113
(Continued)

FOREIGN PATENT DOCUMENTS

CN 106934333 A 7/2017
CN 109614922 A * 4/2019 ......... G06K 9/00355
(Continued)

OTHER PUBLICATIONS

Wang et al., Pelee: A Real-Time Object Detection System on Mobile Devices, Advances in neural information processing systems (Year: 2018).*

(Continued)

*Primary Examiner* — Mohammed Rachedine

(57) ABSTRACT

A dynamic gesture recognition method includes: performing detection on each frame of image of a video stream using a preset static gesture detection model to obtain a static gesture in each frame of image of the video stream; in response to detection of a change of the static gesture from a preset first gesture to a second gesture, suspending the static gesture detection model and activating a preset dynamic gesture detection model; and performing detection on multiple frames of images that are pre-stored in a storage medium using the dynamic gesture detection model to obtain a dynamic gesture recognition result.

20 Claims, 9 Drawing Sheets

(51) Int. Cl.
*G06V 20/40* (2022.01)
*G06V 10/62* (2022.01)
*G06V 10/82* (2022.01)
*G06V 40/10* (2022.01)
*G06N 3/08* (2023.01)
*G06F 18/21* (2023.01)
*G06F 18/20* (2023.01)
*G06F 18/214* (2023.01)

(52) U.S. Cl.
CPC ............ G06F 18/285 (2023.01); G06V 10/95 (2022.01); G06V 20/40 (2022.01)

(56) References Cited

U.S. PATENT DOCUMENTS

| 11,450,146 B2 * | 9/2022 | Wang | .................... G06V 10/809 |
| 2019/0354194 A1 * | 11/2019 | Wang | .................... G06V 10/82 |

FOREIGN PATENT DOCUMENTS

| CN | 109886225 A | * | 6/2019 | | |
| CN | 106934333 B | * | 7/2021 | ............. | G06F 3/017 |

OTHER PUBLICATIONS

ISR for PCT/CN2020/140425.
Written opinions of ISA for PCT/CN2020/140425.

\* cited by examiner

| Stage | Layer | | Output Shape |
|---|---|---|---|
| | Input | | 224 x 224 x 3 |
| Stage 0 | Stem Block | | 56 x 56 x 32 |
| Stage 1 | Dense Block | DenseLayer x 3 | 28 x 28 x 128 |
| | Transition Layer | 1 x 1 conv, stride 1 | |
| | | 2 x 2 average pool, stride 2 | |
| Stage 2 | Dense Block | DenseLayer x 4 | 14 x 14 x 256 |
| | Transition Layer | 1 x 1 conv, stride 1 | |
| | | 2 x 2 average pool, stride 2 | |
| Stage 3 | Dense Block | DenseLayer x 8 | 7 x 7 x 512 |
| | Transition Layer | 1 x 1 conv, stride 1 | |
| | | 2 x 2 average pool, stride 2 | |
| Stage 4 | Dense Block | DenseLayer x 6 | 7 x 7 x 704 |
| | Transition Layer | 1 x 1 conv, stride 1 | |
| Classification Layer | | 7 x 7 global average pool | 1 x 1 x 704 |
| | | 1000D fully-connecte,softmax | |

FIG. 5

DYNAMIC GESTURE RECOGNITION METHOD, DEVICE AND COMPUTER-READABLE STORAGE MEDIUM

CROSS REFERENCE TO RELATED APPLICATIONS

The present application is a continuation-application of International Application PCT/CN2020/140425, with an international filing date of Dec. 28, 2020, which claims foreign priority of Chinese Patent Application No. 202010864060.3, filed on Aug. 25, 2020 in the China National Intellectual Property Administration of China, the contents of all of which are hereby incorporated by reference.

BACKGROUND

1. Technical Field

The present disclosure generally relates to gesture recognition technologies, and particularly to a dynamic gesture recognition method and device.

2. Description of Related Art

Gestures are a natural form of communication between humans. Gesture recognition is one of the important research areas of human-machine interaction. Gesture recognition can be classified into two types: static gesture recognition and dynamic gesture recognition. Compared with static gesture recognition, dynamic gesture recognition involves a continuous process, which requires to learn the relationship of gestures in different frames in the time dimension. Therefore, it is relatively difficult to recognize dynamic gestures.

In the actual application of dynamic gesture recognition, there are usually transition actions between gestures, and the transition actions are complex and have varying durations, making it difficult for algorithms to determine the start time and end time of a certain gesture. In general, in order to prevent missing a dynamic gesture, the dynamic gesture detection model will be continuously executed. Every time a new frame of image is read, it will be merged with several previous frames of images and detected so as to output a recognition result, which may cause two problems. One problem is that if a prediction is made every time a new frame is read and the recognition result is returned, the model may output a wrong gesture because the frame sent to the model may include a previous action and a current action, resulting in lower recognition accuracy. In addition, the dynamic gesture detection model is required to be continuously executed, impose a heavy burden on the gesture recognition devices.

Therefore, there is a need to provide a dynamic gesture recognition method and device to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views. Obviously, the drawings in the following description are only some embodiments of the present disclosure. For those of ordinary skill in the art, other drawings can be obtained based on these drawings without creative labor.

FIG. 5 is a schematic diagram of the network structure of a backbone network according to one embodiment.

DETAILED DESCRIPTION

Figure 1:
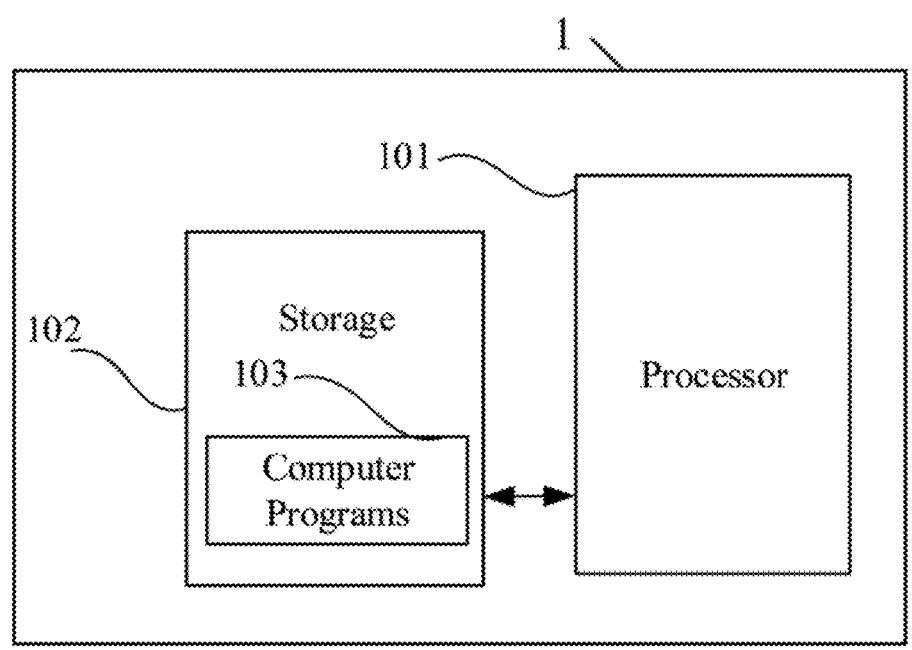
FIG. 1 is a schematic block diagram of a dynamic gesture recognition device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
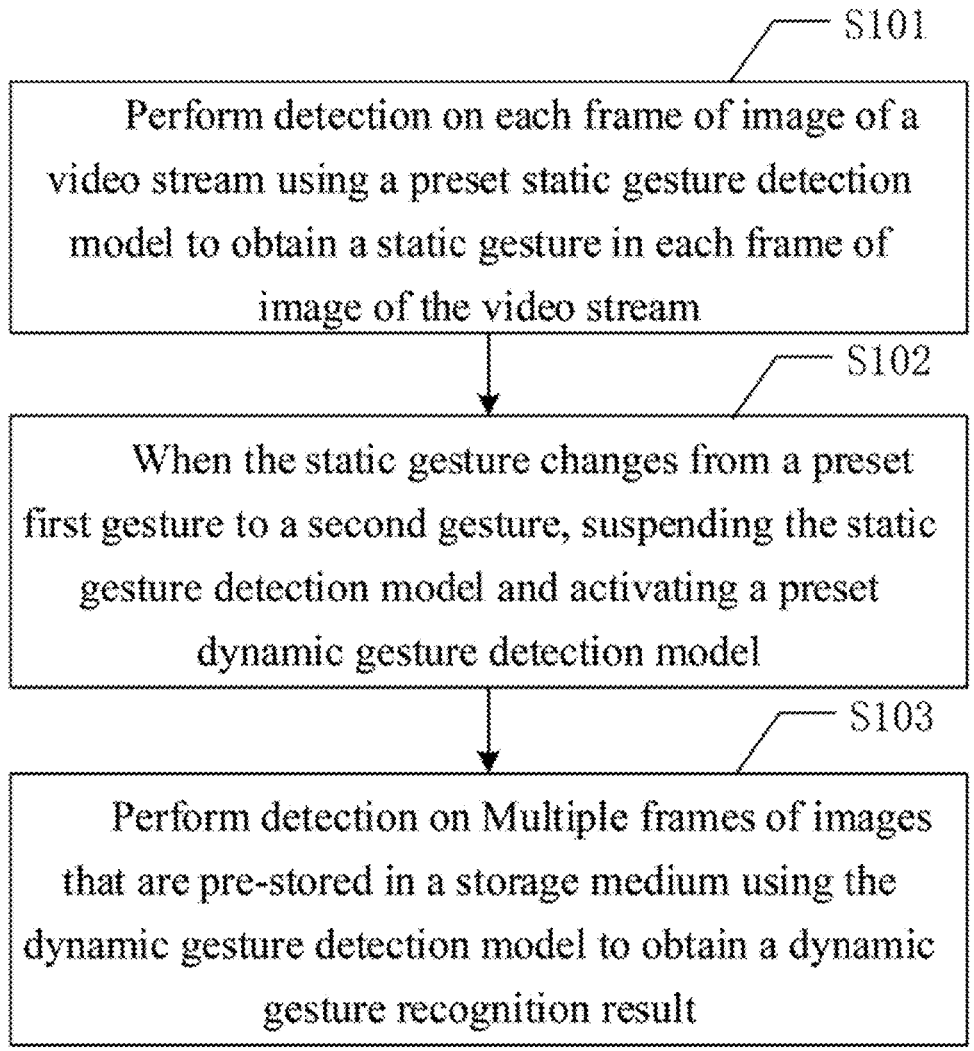
FIG. 2 is a schematic flowchart of a dynamic gesture recognition method according to one embodiment.

FIG. 1 shows a schematic block diagram of a dynamic gesture recognition device 1 according to one embodiment. The device 1 may include a processor 101, a storage 102, and one or more executable computer programs 103 that are stored in the storage 102. The processor 101 is electrically connected to the storage 105, and performs corresponding operations by executing the executable computer programs 103 stored in the storage 102. When the processor 101 executes the computer programs 103, the steps in the embodiments of the method for controlling the device 1, such as steps S101 to S103 in FIG. 2 are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the device 1, such as a hard disk or a memory. The storage 102 may also be an external storage device of the device 1, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the device 1. The storage 102 can also be used to temporarily store data that have been output or is about to be output.

Figure 9:
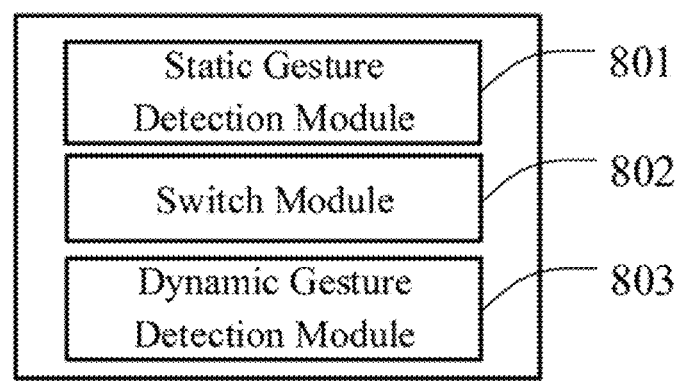
FIG. 9 is a schematic block diagram of a dynamic gesture recognition device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device 1. For example, the one or more computer programs 112 may be divided into a static gesture detection module, a switch module, and a dynamic gesture detection module as shown in FIG. 9.

FIG. 2 shows an exemplary flowchart of a dynamic gesture recognition method according to one embodiment. The method can be implemented to control the device 1 shown in FIG. 1. In one embodiment, the method may include steps S101 to S103.

Step S101: Perform detection on each frame of image of a video stream using a preset static gesture detection model to obtain a static gesture in each frame of image of the video stream.

The static gesture detection model may be any proper conventional model that can realize static gesture detection, which is not limited in the embodiments of the present disclosure. In one embodiment, the static gesture detection model is a model obtained by using Pelee-SSD to train a preset static gesture training set. Pelee-SSD is a lightweight SSD target detection network that uses the PeleeNet as the backbone network, which is suitable for deployment on mobile terminals.

Figure 3:
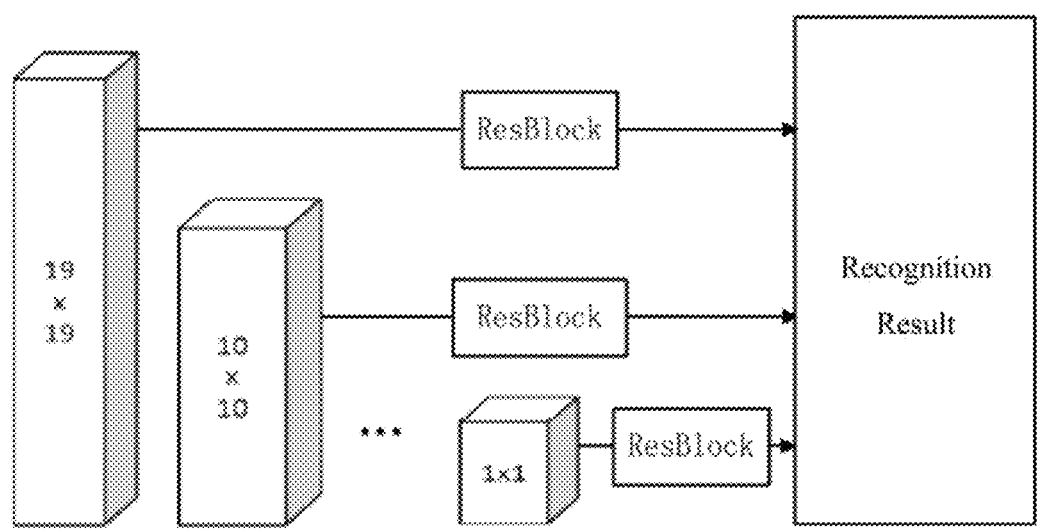
FIG. 3 is schematic diagram of the network structure of a static gesture detection model according to one embodiment.

The network structure of the static gesture detection model is shown in FIG. 3. In order to save the amount of computation, only 19×19, 10×10, 5×5, 3×3, and 1×1 feature maps are connected to the detection branch. A lightweight residual block (ResBlock) is added before the detection layer of each detection branch to ensure the feature expression ability.

Figure 4:
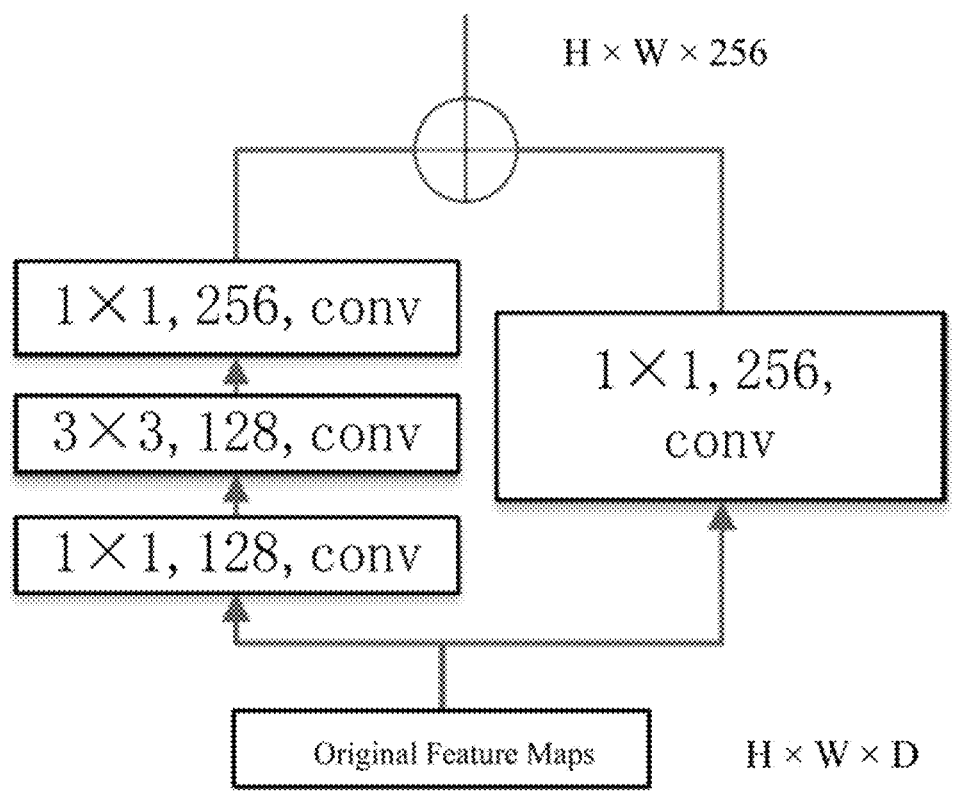
FIG. 4 is a schematic diagram of the internal structure of a residual block according to one embodiment.

The internal structure of the residual block is shown in FIG. 4. The size of the input original feature map is denoted by H×W×D, where H, W and D represent the height, width and depth of an original feature map, respectively. The original feature map is processed by two detection branches. In the first branch, it is processed by three layers of convolution (conv). The number of convolution kernels for the first layer of convolution processing is set to 128, and the size of the convolution kernel is 1×1. The number of convolution kernels for the second layer of convolution processing is set to 128, the size of the convolution kernel is 3×3. The number of convolution kernels for the third layer of convolution processing is set to 256, and the size of the convolution kernel is 1×1. The original feature map undergoes a layer of convolution processing in the second branch, the number of convolution kernels is set to 256, and the size of the convolution kernel is 1×1. The outputs of the two branches are added together to form the output feature map of the residual block, and the size of the output feature map is recorded as H×W×256.

The network structure of the backbone network PeleeNet is shown in FIG. 5. The size of the input is 224×224×3, which will go through stage 0, stage 1, stage 2, stage 3, and stage 4. Thus, the output of one stage will be the input of the next stage. After the processing by a stem block in stage 0, the output size is 56×56×32. In stage 1, the input will be processed by a dense block and a transition layer. The dense block includes 3 dense layers, the transition layer includes 1×1 convolution processing with a stride of 1 and 2×2 average pooling processing with a stride of 2, and the output size is 28×28×128. In stage 2, the input will be processed by a dense block and a transition layer. The dense block includes 4 dense layers, the transition layer includes 1×1 convolution processing with a stride of 1 and 2×2 average pooling processing with a stride of 2, and the output size is 14×14×256. In stage 3, the input will be processed by a dense block and a transition layer. The dense block includes 8 dense layers, the transition layer includes 1×1 convolution processing with a stride of 1 and 2×2 average pooling processing with a stride of 2, and the output size is 7×7×512. In stage 4, the input will be processed by a dense block and a transition layer. The dense block includes 6 dense layers, the transition layer includes 1×1 convolution processing with a stride of 1, and the output size is 7×7×704. Finally, the output of the stage 4 will be inputted by and processed by a classification layer. In the classification layer, the input will be processed by a 7×7 global average pool. The output size is 1×1×704, which will go through a fully-connected layer and a softmax processing to obtain the final result.

In one embodiment, standard first gestures and other gestures can be collected, and the first gesture can be set according to actual situations, for example, it can be set as a clenched fist with the palm facing the camera. The collected gestures are fine-labeled as a static gesture training set. The Pelee-SSD is used to train the training set, so that the trained model can detect whether there are gestures in the images, and whether the gestures are a fist (labeled as fist) or other gestures (labeled as others).

Step S102: In response to detection of a change of the static gesture from a preset first gesture to a second gesture, suspend the static gesture detection model and activate a preset dynamic gesture detection model. The second gesture is a gesture other than the first gesture Specifically, the number of frames of images in which the static gesture is the first gesture is accumulated. When the number is greater than a first threshold, the dynamic gesture detection model starts to be in a preparation stage. The first threshold value is denoted by T1, which can be set according to actual needs. In the embodiment, T1 is set to 20, i.e., T1=20.

After the dynamic gesture detection model is in the preparation stage, the number of frames of images in which the static gesture is the second gesture is accumulated. When the number of frames of images in which the static gesture is the second gesture is greater than a second threshold, it is determined that the first gesture has been changed into the second gesture, and the static gesture detection model is suspended and the preset dynamic gesture detection model is activated. The second threshold value is denoted by T2, which can be set according to actual needs. In the embodiment, T2 is set to 10, i.e., T2=10.

Figure 6:
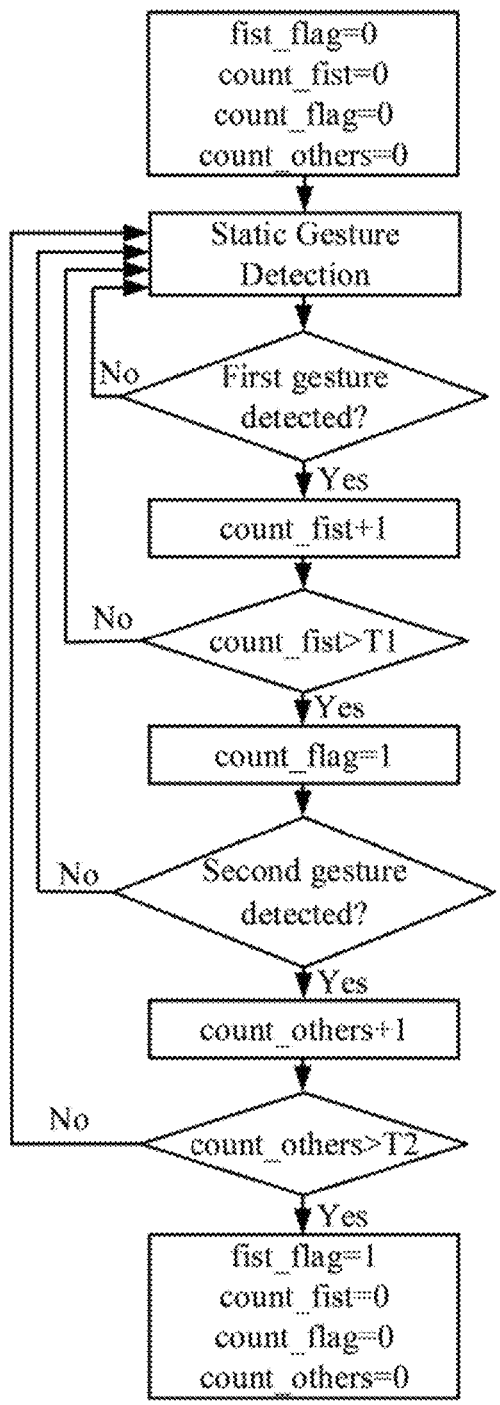
FIG. 6 is a schematic flowchart of a static gesture detection stage according to one embodiment.

FIG. 6 is a schematic flowchart of the static gesture detection stage according to one embodiment. As shown in the figure, in one embodiment, the following four parameters can be set: a model control flag (denoted by fist_flag), a first count value (denoted by count_fist), a second count value (denoted by count_others), and a count flag (denoted by count_flag). These parameters are used to control the activating and deactivating of the static gesture detection model and the dynamic gesture detection model. The initial values of the four parameters are set to 0.

The value of fist_flag can be 0 or 1. The function of this parameter is to control the activating and deactivating of the two models. Specifically, if fist_flag=0, the static gesture detection is performed; if fist_flag=1, the static gesture detection is ended and the dynamic gesture detection is performed.

The count_fist represents the count of the detected first gestures, and count_fist is incremented by 1 every time one first gesture is detected in an image.

The value of count_flag can be 0 or 1. When count_fist is greater than T1, the value of count_flag changes from 0 to 1.

The count_others represents the count of the detected second gestures. Before count_flag becomes 1, even if the second gesture is detected, count_others will not be accumulated. Only when count_flag becomes 1 and the second gesture is detected, count_others will be accumulated by 1. If the value of count_others is greater than T2, it means that the user has being performing other gestures for more than 10 frames after making a fist for more than 20 frames. In this case, it is determined that the user has transitioned from the preparation stage to the stage of starting dynamic gesture detection, and the value of fist_flag changes from 0 to 1, that is, the static gesture detection phase ends, and count_fist, count_flag, and count_others are set to 0 again.

Step S103: Perform detection on a number of frames of images that are pre-stored in a storage medium using the dynamic gesture detection model to obtain a dynamic gesture recognition result.

The dynamic gesture detection model may be any proper conventional model that can realize dynamic gesture detection, which is not limited in the embodiments of the present disclosure. In one embodiment, the dynamic gesture detection model is a model obtained by using 3D-MobileNetV2 to train a preset dynamic gesture training set.

For dynamic gestures, the not only have spatial domain characteristics, but also temporal domain characteristics. Conventional 2D CNN is difficult to extract temporal feature. Therefore, 3D CNN has become one of the mainstream methods for dynamic gesture recognition. 3D CNN can simultaneously extract spatial and temporal information from a sequence. It consists of multiple 3D convolutional layers, 3D pooling layers and activation functions. The operation of the 3D convolutional layer and the 3D pooling layer on the feature map is similar to that of the 2D convolutional layer and the 2D pooling layer. The only difference is that the 2D convolutional layer and the 2D pooling layer only work on one feature map in the width and height dimensions. However, the 3D convolutional layer and the 3D pooling layer operate on multiple feature maps simultaneously in the width, height, and time dimensions. Therefore, 3D CNN can simultaneously extract spatial and temporal information from the sequence.

3D CNN receives multiple frames of images as input. In actual applications, 3D CNN-based methods can achieve good performance, but its requirement of large amount of calculation results in high deployment costs. Therefore, it is very important to design a lightweight and resource-efficient 3D CNN architecture. For example, several efficient lightweight networks (e.g., MobileNet, MobileNetV2, ShuffleNet, ShuffleNetV2, and SqueezeNet) are converted from 2DCNN to 3D CNN, which makes a great contribution to the exploration of lighter and more practical 3D models. MobileNetV2 proposes a new layer structure, that is, an inverted residual structure with a linear bottleneck. The module first expands the input low-dimensional compressed representation to high-dimensional, and uses lightweight deep convolution for filtering. The linear bottleneck is then used to project the features back to the low-dimensional compressed representation. This module does not implement large tensors in the inference process, which reduces the need for embedded hardware design to access the main memory, and is suitable for mobile devices. The use of 3D CNN based on MobileNetV2 for dynamic gesture recognition can achieve high classification accuracy while maintaining a small model.

The dynamic gesture detection model starts with a convolutional layer, then goes through 17 MobileNetV2 blocks and the convolutional layer, and finally ends with a linear layer. Each block is a reverse residual blocks, whose internal structure is shown in the left diagram of FIG. 7. The number of input original feature maps is F, and the size of each original feature map is denoted by D×H×W, where H, W and D are the height, width and depth of the original feature map. The stride in all three dimensions is 1, that is, stride=(1,11). The original feature maps go through two branches. No processing is performed on the first branch, and three layers of processing are successively performed on the second branch. The first layer is the convolution (Conv) processing with the convolution kernel size of 1×1×1, and the number of output feature maps is 6F. After batch normalization (BN) and linear rectification function (ReLU6) processing, the feature maps go to the second layer. The second layer is a deep convolution (DWConv) processing with a convolution kernel size of 3×3×3, the number of output feature maps is 6F, and then the feature maps go to the third layer after BN and ReLU6 processing. The third layer is convolution processing with a convolution kernel size of 1×1×1, the number of output feature maps is F, and the feature maps are outputted after being processed by BN. The outputs of the two branches are added together to form the final output feature map, the number of output feature maps is F, and its size is D×H×W.

Figure 7:
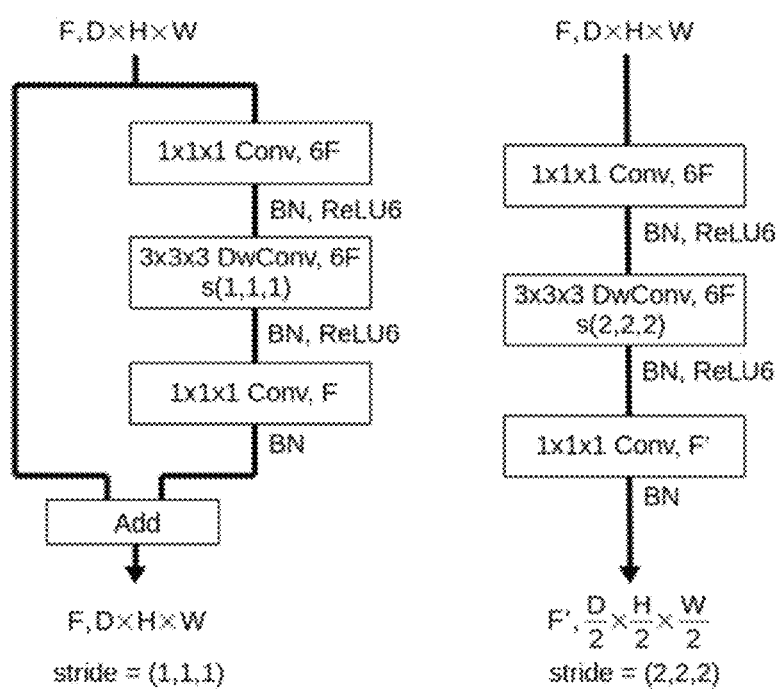
FIG. 7 is a schematic diagram of the internal structure of a reverse residual block of a dynamic gesture detection model according to one embodiment.

The right diagram in FIG. 7 shows the MobileNetV2 Block that downsamples by two in the time and space domain. The number of input original feature maps is F, and the size of each original feature map is denoted by D×H×W. The stride in all three dimensions is 2, namely stride=(2,2,2). The input original feature maps are successively processed by three layers. The first layer is convolution processing with a convolution kernel size of 1×115×1, and the number of output feature maps is 6F. After being processed by RN and ReLU6 processing, the feature maps go to the second layer. The second layer is a deep convolution processing with a convolution kernel size of 3×3×3, and the number of output feature maps is 6F. After being processed by BN and ReLU6 processing, the feature maps go to the third layer. The third layer is the convolution processing with the convolution kernel size of 1×1×1, and the number of output feature maps is denoted by F'. The final output feature maps are obtained after being processed by BN. The number of output feature maps is F', and the size of each output feature map is denoted by $$\frac{D}{2} \times \frac{H}{2} \times \frac{W}{2}.$$

In one embodiment, various dynamic gestures can be collected and can be fine-labeled as a dynamic gesture training set. The 3D-MobileNetV2 is used to train the training set, so that the trained model can return a dynamic gesture prediction result after acquiring several dynamic gesture images.

Figure 8:
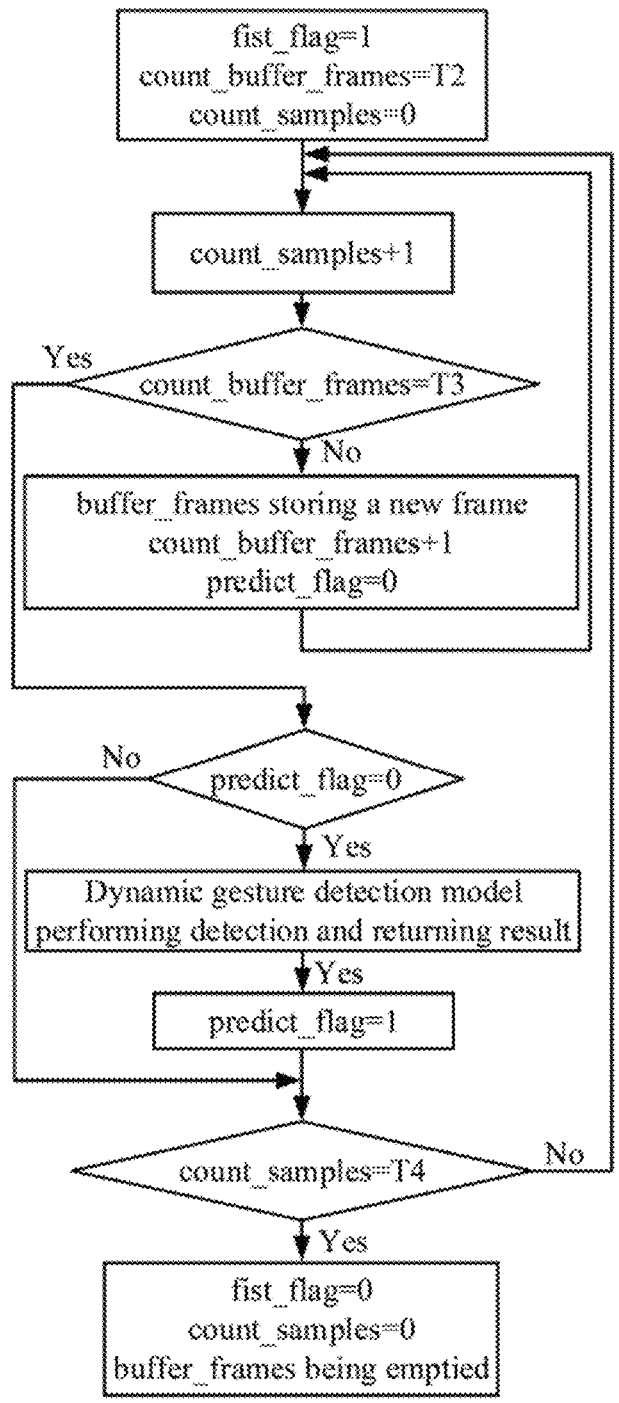
FIG. 8 is a schematic flowchart of a dynamic gesture detection stage according to one embodiment.

FIG. 8 is a schematic flowchart of the dynamic gesture detection stage. In one embodiment, four parameters can be set as follows.

A frame count value (denoted by count_samples) represents the count of the frames read during the dynamic gesture recognition stage. Its initial value is set to 0. When the fist_flag in the previous stage becomes 1, count_samples starts to accumulate. Each time a frame is read, the count_samples increases by 1.

The image frame array (denoted as buffer_frames) is an array used to represent each frame of image stored in the storage medium. In one embodiment, before the dynamic gesture detection model is activated, the frames of images in which the static gesture is the second gesture are successively stored in the storage medium. After the dynamic gesture detection model is activated, each frame of image in the video stream is stored in the storage medium until the number of frames of images stored in the storage medium is equal to a preset third threshold that is denoted by T3. T3 can be set according to actual needs. In the embodiment, T3 is set to 30, i.e., T3=30.

A count value of the number of stored frames (denoted by count_buffer_frames) represents the count of the frames of images stored in the array buffer_frames. Its initial value is T2, and the maximum value of T2 is equal to T3.

A counting flag (denoted by predict_flag) is used to control the activating and deactivating of the dynamic gesture recognition. Its initial value is set to 0. When count_buffer_frames reaches the third threshold and predict_flag=0, the dynamic gesture detection model recognizes the frames stored in the array buffer_frames and returns the result. After the recognition is finished, predict_flag=1.

When count_samples reaches the preset fourth threshold, the buffer frame is emptied, that is, count_buffer_frames=0, count_samples=0, fist_flag=0. The fourth threshold is denoted by T4 and can be set according to actual needs. In the embodiment, T4 is set to 42, i.e., T4=42.

It can be seen from the above process that after a prediction is performed, the dynamic gesture detection model is deactivated. The two models are executed in a serial manner, and only one of the models is running at a time. When the models are relatively lightweight, the entire gesture recognition process can be smoothly performed.

The embodiments of the present disclosure combine the static gesture detection model with the dynamic gesture detection model, and use the static gesture detection model to detect the first gesture as a wake-up action. When the first gesture changes into another gesture, the dynamic gesture detection model will be activated, and the dynamic gesture recognition result will be returned. During the dynamic gesture recognition, the static gesture detection model will be suspended, that is, the two models will not run at the same time. After the dynamic gesture detection model is activated, it only performs the detection process once, instead of merging with the previous frames, performing a detection and returning the result every time a new frame is read, which can avoid the recognition error occurred when different actions are alternated, improve the recognition accuracy, and reduce the operating load.

It should be understood that in the embodiments of the present disclosure, sequence numbers of steps do not mean an execution order. The execution order of the steps should be determined according to functions and internal logic of the steps.

FIG. 9 shows a schematic block diagram of a dynamic gesture recognition device according to one embodiment. The dynamic gesture recognition device may include a static gesture detection module 801, a switch module 802, and a dynamic gesture detection module 803.

The static gesture detection module 801 is to perform detection on each frame of image of a video stream using a preset static gesture detection model to obtain a static gesture in each frame of image of the video stream. The switch module 802 is to, in response to detection of a change of the static gesture from a preset first gesture to a second gesture, suspend the static gesture detection model and activate a preset dynamic gesture detection model. The dynamic gesture detection module 803 is to perform detection on a plurality of frames of images that are pre-stored in a storage medium using the dynamic gesture detection model to obtain a dynamic gesture recognition result.

In one embodiment, the switch module may include a first accumulating unit, a second accumulating unit, and a switch unit. The first accumulating unit is to accumulate a number of frames of images in which the static gesture is the first gesture. The second accumulating unit is to, in response to the number being greater than a first threshold, accumulate a number of frames of images in which the static gesture is the second gesture. The switch unit is to, in response to the number of frames of images in which the static gesture is the second gesture being greater than a second threshold, determine that the first gesture has been changed into the second gesture, suspend the static gesture detection model and activate a preset dynamic gesture detection model.

The device may further include a first storage module and a second storage module. The first storage module is to store each frame of image, in which the static gesture is the second gesture before the dynamic gesture detection model is activated, in the storage medium successively. The second storage module is to store each frame of image of the video stream after the dynamic gesture detection model is activated until a number of frames of images stored in the storage medium is equal to a third threshold.

The device may further include a clearing module that is to, in response to a number of frames of images counted after the dynamic gesture detection model is activated being equal to a fourth threshold, clear each frame of images stored in the storage medium for the next round of dynamic gesture recognition.

The device may further include a first setting module, a second setting module, and a third setting module. The first setting module is to, in the initial state, set a model control flag to a first value that indicates execution of a static gesture detection. The second setting module is to, in response to detection of a change of the static gesture from a preset first gesture to a second gesture, set the model control flag to a second value that indicates execution of a dynamic gesture detection. The third setting module is to, in response to number of frames of images counted after the dynamic gesture detection model is activated being equal to the fourth threshold, set the model control flag to the first value.

For concepts, explanations, and detailed descriptions related to the technical solution provided by this embodiment of the present disclosure, used in the device, refer to descriptions about the content in the foregoing method or other embodiments. Details are not described again herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented dynamic gesture recognition method, comprising:
   performing detection on each frame of image of a video stream using a preset static gesture detection model to obtain a static gesture in each frame of image of the video stream;
   in response to detection of a change of the static gesture from a preset first gesture to a second gesture, suspending the static gesture detection model and activating a preset dynamic gesture detection model; and
   performing detection on a plurality of frames of images that are pre-stored in a storage medium using the dynamic gesture detection model to obtain a dynamic gesture recognition result;
   wherein suspending the static gesture detection model and activating the preset dynamic gesture detection model comprise:

accumulating a number of frames of images in which the static gesture is the first gesture;
in response to the number being greater than a first threshold, accumulating a number of frames of images in which the static gesture is the second gesture; and
in response to the number of frames of images in which the static gesture is the second gesture being greater than a second threshold, determining that the first gesture has been changed into the second gesture, suspending the static gesture detection model and activating a preset dynamic gesture detection model.

2. The method of claim 1, further comprising, before performing detection on the plurality of frames of images that are pre-stored in the storage medium using the dynamic gesture detection model to obtain the dynamic gesture recognition result,
storing each frame of image, in which the static gesture is the second gesture before the dynamic gesture detection model is activated, in the storage medium successively; and
storing each frame of image of the video stream after the dynamic gesture detection model is activated until a number of frames of images stored in the storage medium is equal to a third threshold.

3. The method of claim 1, further comprising, after performing detection on the plurality of frames of images that are pre-stored in the storage medium using the dynamic gesture detection model to obtain the dynamic gesture recognition result,
in response to a number of frames of images counted after the dynamic gesture detection model is activated being equal to a fourth threshold, clearing each frame of images stored in the storage medium.

4. The method of claim 3, further comprising:
in the initial state, setting a model control flag to a first value that indicates execution of a static gesture detection;
in response to detection of a change of the static gesture from a preset first gesture to a second gesture, setting the model control flag to a second value that indicates execution of a dynamic gesture detection; and
in response to number of frames of images counted after the dynamic gesture detection model is activated being equal to the fourth threshold, setting the model control flag to the first value.

5. The method of claim 1, wherein the static gesture detection model is a model obtained by using Pelee-SSD to train a preset static gesture training set.

6. The method of claim 1, wherein the dynamic gesture detection model is a model obtained by using 3D-MobileNetV2 to train a preset dynamic gesture training set.

7. A dynamic gesture recognition device comprising:
one or more processors;
a memory; and
one or more programs, wherein the one or more programs are stored in the memory and configured to be executed by the one or more processors, the one or more programs comprise:
instructions for performing detection on each frame of image of a video stream using a preset static gesture detection model to obtain a static gesture in each frame of image of the video stream;
instructions for, in response to detection of a change of the static gesture from a preset first gesture to a second gesture, suspending the static gesture detection model and activating a preset dynamic gesture detection model; and instructions for, performing detection on a plurality of frames of images that are pre-stored in a storage medium using the dynamic gesture detection model to obtain a dynamic gesture recognition result;
wherein the instructions for suspending the static gesture detection model and activating the preset dynamic gesture detection model comprise:
instructions for accumulating a number of frames of images in which the static gesture is the first gesture;
instructions for, in response to the number being greater than a first threshold, accumulating a number of frames of images in which the static gesture is the second gesture; and
instructions for, in response to the number of frames of images in which the static gesture is the second gesture being greater than a second threshold, determining that the first gesture has been changed into the second gesture, suspending the static gesture detection model and activating a preset dynamic gesture detection model.

8. The device of claim 7, wherein the one or more programs further comprise, before performing detection on the plurality of frames of images that are pre-stored in the storage medium using the dynamic gesture detection model to obtain the dynamic gesture recognition result,
instruction for storing each frame of image, in which the static gesture is the second gesture before the dynamic gesture detection model is activated, in the storage medium successively; and
instruction for storing each frame of image of the video stream after the dynamic gesture detection model is activated until a number of frames of images stored in the storage medium is equal to a third threshold.

9. The device of claim 7, wherein the one or more programs further comprise, after performing detection on the plurality of frames of images that are pre-stored in the storage medium using the dynamic gesture detection model to obtain the dynamic gesture recognition result,
instruction for, in response to a number of frames of images counted after the dynamic gesture detection model is activated being equal to a fourth threshold, clearing each frame of images stored in the storage medium.

10. The device of claim 9, wherein the one or more programs further comprise:
instructions for, in the initial state, setting a model control flag to a first value that indicates execution of a static gesture detection;
instructions for, in response to detection of a change of the static gesture from a preset first gesture to a second gesture, setting the model control flag to a second value that indicates execution of a dynamic gesture detection; and
instructions for, in response to number of frames of images counted after the dynamic gesture detection model is activated being equal to the fourth threshold, setting the model control flag to the first value.

11. The device of claim 7, wherein the static gesture detection model is a model obtained by using Pelee-SSD to train a preset static gesture training set.

12. The device of claim 7, wherein the dynamic gesture detection model is a model obtained by using 3D-MobileNetV2 to train a preset dynamic gesture training set.

13. A non-transitory computer-readable storage medium storing one or more programs to be executed in a dynamic gesture recognition device, the one or more programs, when being executed by one or more processors of the dynamic gesture recognition device, causing g legged robot to perform processing comprising:
- performing detection on each frame of image of a video stream using a preset static gesture detection model to obtain a static gesture in each frame of image of the video stream;
- in response to detection of a change of the static gesture from a preset first gesture to a second gesture, suspending the static gesture detection model and activating a preset dynamic gesture detection model; and
- performing detection on a plurality of frames of images that are pre-stored in a storage medium using the dynamic gesture detection model to obtain a dynamic gesture recognition result;
- wherein suspending the static gesture detection model and activating the preset dynamic gesture detection model comprise:
- accumulating a number of frames of images in which the static gesture is the first gesture;
- in response to the number being greater than a first threshold, accumulating a number of frames of images in which the static gesture is the second gesture; and
- in response to the number of frames of images in which the static gesture is the second gesture being greater than a second threshold, determining that the first gesture has been changed into the second gesture, suspending the static gesture detection model and activating a preset dynamic gesture detection model.

14. The non-transitory computer-readable storage medium of claim 13, further comprising, before performing detection on the plurality of frames of images that are pre-stored in the storage medium using the dynamic gesture detection model to obtain the dynamic gesture recognition result,
- storing each frame of image, in which the static gesture is the second gesture before the dynamic gesture detection model is activated, in the storage medium successively; and
- storing each frame of image of the video stream after the dynamic gesture detection model is activated until a number of frames of images stored in the storage medium is equal to a third threshold.

15. The non-transitory computer-readable storage medium of claim 13, further comprising, after performing detection on the plurality of frames of images that are pre-stored in the storage medium using the dynamic gesture detection model to obtain the dynamic gesture recognition result,
- in response to a number of frames of images counted after the dynamic gesture detection model is activated being equal to a fourth threshold, clearing each frame of images stored in the storage medium.

16. The non-transitory computer-readable storage medium of claim 15, further comprising:
- in the initial state, setting a model control flag to a first value that indicates execution of a static gesture detection;
- in response to detection of a change of the static gesture from a preset first gesture to a second gesture, setting the model control flag to a second value that indicates execution of a dynamic gesture detection; and
- in response to number of frames of images counted after the dynamic gesture detection model is activated being equal to the fourth threshold, setting the model control flag to the first value.

17. The non-transitory computer-readable storage medium of claim 13, wherein the static gesture detection model is a model obtained by using Pelee-SSD to train a preset static gesture training set.

18. The non-transitory computer-readable storage medium of claim 13, wherein the dynamic gesture detection model is a model obtained by using 3D-MobileNetV2 to train a preset dynamic gesture training set.

19. The non-transitory computer-readable storage medium of claim 13, wherein the first threshold is 20.

20. The non-transitory computer-readable storage medium of claim 13, wherein the second threshold is 10.

* * * * *